United States Patent
Roberts

(10) Patent No.: US 8,165,890 B2
(45) Date of Patent: *Apr. 24, 2012

(54) GREEN RATING SYSTEM AND ASSOCIATED MARKETING METHODS

(76) Inventor: Charles E. S. Roberts, London (GB)

( * ) Notice: Subject to any disclaimer, the term of this patent is extended or adjusted under 35 U.S.C. 154(b) by 1009 days.

This patent is subject to a terminal disclaimer.

(21) Appl. No.: 11/967,964

(22) Filed: Dec. 31, 2007

(65) Prior Publication Data

US 2009/0171992 A1    Jul. 2, 2009

(51) Int. Cl.
*G06Q 10/00* (2012.01)
(52) U.S. Cl. .......................................... 705/1.1
(58) Field of Classification Search .......................... None
See application file for complete search history.

(56) References Cited

U.S. PATENT DOCUMENTS

| | | | | |
|---|---|---|---|---|
| 6,490,565 | B1* | 12/2002 | Beldock | 705/7.38 |
| 7,092,898 | B1* | 8/2006 | Mattick et al. | 705/14.41 |
| 7,197,397 | B2* | 3/2007 | Matsuda et al. | 702/2 |
| 2004/0093098 | A1* | 5/2004 | Ohki et al. | 700/90 |
| 2005/0021389 | A1* | 1/2005 | Dias et al. | 705/10 |
| 2005/0203866 | A1 | 9/2005 | Daud et al. | |
| 2005/0209905 | A2* | 9/2005 | Ness et al. | 705/10 |
| 2006/0020502 | A1* | 1/2006 | Trout et al. | 705/9 |
| 2006/0100897 | A1* | 5/2006 | Halloran et al. | 705/1 |
| 2006/0129450 | A1* | 6/2006 | Zarrow | 705/11 |
| 2006/0265230 | A1* | 11/2006 | Shiga | 705/1 |
| 2006/0286518 | A1 | 12/2006 | Yoder | |
| 2008/0160147 | A1* | 7/2008 | Tormey | 426/383 |
| 2009/0106317 | A1* | 4/2009 | Letendre-Hedlund | 707/104.1 |
| 2009/0119023 | A1* | 5/2009 | Zimmer et al. | 702/22 |

FOREIGN PATENT DOCUMENTS

| WO | WO02019230 | | 3/2002 |
|---|---|---|---|
| WO | WO2006107314 | A1 | 10/2006 |

* cited by examiner

*Primary Examiner* — Jonathan Ouellette

(57) ABSTRACT

A method and system for assigning a rating to an entity based on a plurality of metrics, for example, assigning a rating to an entity which reflects that entity's level of environmental performance, and then assigning an indicia to the entity which reflects the rating relative to other like entities. The system includes ways to generate revenue based on the entity's use of the indicia, such as integrating the display of the indicia with search engines such that the indicia is displayed when the entity's link appears on a search results list and charging a per impression and/or a per click through microfee. The invention also comprises a filtered search facility which only features rated member entities on its search results list. A website is also provided which contains landing pages for each rated entity which may be accessed by clicking on the displayed indicia in the search results list.

57 Claims, 7 Drawing Sheets

GREEN RATING SYSTEM AND ASSOCIATED MARKETING METHODS

FIELD OF THE INVENTION

The present invention relates to the field of marketing, and, in particular, to a method of marketing utilizing a green rating system to market companies based on their degree of environmental responsibility, using both the internet and non computer-based methods.

BACKGROUND OF THE INVENTION

Recent concerns regarding global climate change have given rise to the concept that an entity, whether an individual, corporation or government, can be "green" with respect to certain behaviors which may involve an environmental impact.

The green movement is premised on two assumptions. First, that global climate change is occurring and that it is causing the climate of the Earth to warm, and, second, that human activity, in particular industrial activity, is a factor in the change, as opposed to any such changes occurring naturally as the result of natural global climate cycles.

This is based on the theory that the levels of various greenhouse gases (GHG) in the atmosphere, in particular the six identified by the Kyoto Protocol—carbon dioxide ($CO_2$), methane ($CH_4$), Nitrous Oxide ($N_2O$), hydrofluorocarbons (HFCs), perfluorocarbons (PFCs), and sulphur hexafluoride ($SF_6$)—have been increasing as the result of human activity, and that this increase is causing, or at least contributing to, a general warming trend in the Earth's climate in a manner well understood by those of skill in the art.

The net greenhouse gas emission of an entity is often measured in equivalent units of CO2 and referred to as an entity's "carbon footprint". An entity's carbon footprint is believed to be a representative measure of that entity's impact on the environment vis-à-vis the concentration of GHG in the atmosphere. Entities that undertake initiatives to reduce their carbon footprint are often deemed to be socially responsible, and are therefore often labeled as being "green" or environmentally friendly.

There are a number of basic components to consider in making a determination of, or in attempting to measure an entity's carbon footprint. Of primary concern are operational effects, in which emissions arising from the activities undertaken by the entity itself (and other emitting entities it has ownership or control of) are considered. There are also upstream and downstream effects which may also be taken into account in determining an entity's net emissions.

For the purposes of accurate 'carbon accounting', the operational activities of the entity may be further subdivided into direct GHG emissions and indirect GHG emissions.

Direct operational emissions are defined as having occurred from sources that are owned or controlled by the entity, including, for example, emissions from combustion in owned boilers or vehicles. For the purposes of compiling emissions data reports for carbon auditing and regulatory submission, an entity's direct emissions are often collectively referred to as Scope 1 emissions by those of skill in the art. These emissions can be measured accurately utilizing equations which may require, for example, knowledge of mass/volume of fuel burned per unit time and knowledge of how the fuel was burned.

An entity's Scope 1 emissions can be affected by many factors, including such things as the manner in which factories are operated or goods are transported within and by the company. For example, a company using hybrid vehicles to transport its goods rather than traditional internal-combustion-only vehicles may be deemed to have reduced its carbon footprint by a certain degree. Likewise, companies who have undertaken efforts to reduce their factory emissions, for example by using on-site renewable heat sources such as solar thermal paneling, will also have a smaller carbon footprint than companies that have not engaged in such efforts.

Indirect operational emissions are defined as having resulted from the generation of the electricity consumed by the entity. These emissions occur physically at the facility where electricity is generated by the entity's supplier and are often collectively referred to as Scope 2 emissions by those of skill in the art. These emissions also can be calculated with a high degree of accuracy using knowledge of the amount of electricity used in a particular time period (for instance in Megawatt-Hours), and then using the 'emissions factor' relating to a particular power supplier and specified tariff.

These Scope 2 emissions will be decreased proportionally if the entity chooses an electricity supply tariff that includes a component of renewable energy. Likewise, emissions may be reduced if the entity is able to reduce its need to import electricity from an outside supplier by such methods as improving energy efficiency, or developing on-site renewable power sources such as solar photovoltaic panels.

A range of other emissions relating to an entity's activities may also be considered in calculating its net carbon footprint. These will vary by industry sector and sub-sector and are often referred to as Scope 3 emissions. They may include emissions resulting from such activities as employee travel, and travel to the entity's premises of downstream consumers. Both upstream and downstream suppliers of the entity's value chain may be considered in estimating Scope 3 emissions. This may be important, for instance because the 'carbon-intense' parts of the value chain might be performed by a third party rather than by the entity under consideration, but still arise as a result of the entity's business. An example of the latter would be an online mail-order firm which, having a small warehouse and office, might cause low direct/indirect emissions itself, but subcontracts a delivery firm with a fleet of trucks and high emissions. The downstream effects factor may also be affected by a plethora of other factors which are likely to vary from industry to industry.

An additional downstream emissions source which may be factored into an assessment of the green-ness of a particular company is consideration of how efficiently a company's products operate. This would include manufacturers of products which consume electricity (causing indirect emissions), for instance televisions, or burn fuel (causing direct emissions), for instance automobiles. Because the products would not be owned or operated by the company during their use and resulting emissions, these would be considered Scope 3 downstream emissions.

Likewise, the emissions resulting from upstream suppliers to a particular entity's business activity may need to be taken into account for calculation of net carbon footprint. For example, suppliers of raw materials and other resources to an entity may be considered green or not green, depending upon how they conduct their affairs. Entities wishing to reduce their own net carbon footprint may therefore choose to do business with like-minded entities, for example, choosing a supplier that uses low-emission vehicles or relies on renewable energy to power their facilities.

Naturally, there are costs associated with being green. Raw materials from upstream green suppliers may be more costly than obtaining the same resources from a less-green company. Costs of renovating factories to be more environmentally friendly can be significant Therefore, there may be varying degrees of "green-ness", depending upon how much of an investment a company is willing or able to make and how much its carbon footprint can be reduced.

There may also be advantages to making a company's operations as green as possible. More and more companies are becoming environmentally friendly because their customers and investors demand it, preferring to do business with green companies rather than with non-green (or "less green") companies. Consumers, whether they be end-users of the production of an entity, or a downstream consumer, may be willing to pay more to deal with a company that is green. In the case of downstream customers, doing business with a green upstream provider may have the effect of lowering the company's overall carbon footprint. With respect to end consumers, many such people are environmentally conscientious and would prefer to purchase goods and services from green companies, regardless of whether or not the goods and services are being offered at the lowest market price. Likewise, many investors wish to have a green portfolio, and institutional investing funds have been established that will only invest in green companies. Therefore, companies may be rewarded for being green and may therefore wish to re-engineer themselves and their products to be as environmentally friendly as possible.

Therefore, there is need of a means to assess the degree of "green-ness" of an entity, to compare it to other similar entities, and to allow the entity to maximize the return on its green investment by making use of it as a marketing tool. There is a need therefore, of a method of marketing which is based on the desire to reward those companies that have made significant efforts to become green.

SUMMARY OF THE INVENTION

Disclosed herein is a system for rating a company based on its degree of green-ness and a way to utilize that rating as a marketing tool for the company. The rating will represent the company's environmental performance in a simple and readily understandable way.

In one aspect of the invention, companies are rated based on several factors, but principally based on their carbon footprint, against other companies in their same industrial sector, with the rating serving as a relative indicator of the degree of green-ness of the company with respect to the companies that it is rated against. A company's emissions may be normalized based on size within their industrial sector and in such a case, would only be rated against other companies in a size-adjusted manner. The adjustment for size may take the form of an emissions 'rate'—that is, emissions per unit size. For instance, GHG emissions might be measured as a function of sales revenue, expressing the emissions rate as tons of $CO_2$ per unit of sales (for example, per $1K or $1M in sales). Other size-related metrics, such as square-footage of facilities, number of employees, or industry-specific measures such as tonnage of steel or cement produced may also be used, alone or in combination.

Alternatively, companies may be subdivided within their industrial sector and in such a case may only compared to other companies of comparable size.

Either of the rating methods above may be relative to other companies operating in the same sector, but in these embodiments, the whole sector may be represented in the ratings.

In an alternate embodiment, the rating may be based on a "premiership" model, in which, once the size-adjusted data has been compared, only a specified top percentage of a sector will be rated. This will have the effect of making the entry barrier higher for even the lowest rating in a particular category. In another embodiment there may be a shift, over time, from the premiership model to the whole sector model, as all entities within the sector may improve their performance relative to the criteria used in the ratings process. That is, the initial premiership model may be adjusted to a model allowing ratings allocation for all entities within a sector. In this embodiment, the initial top entities within the premiership model may be allowed a rating higher then the original top rating permitted at the inception of the Greenstar service Companies may be rated relative to virtual model companies in their sector. For example, real companies may be compared to a virtual model of a "green superstar" company to see if they are worthy of receiving the highest green-ness rating in their sector. Likewise, a virtual model of an "ostrich" company (that is, a company that chooses to ignore the problem and has taken no steps whatsoever to improve its greenness) will be used to determine the lowest ratings in the sector.

IN an alternate embodiment, the rating could be an absolute rating which is dependent upon specific achievements related to improving the green-ness of the company. Utilizing such a rating scheme, it would theoretically be possible for all companies to achieve the highest rating.

A sector may be based on, for example, the type of products produced or services rendered, or may be dependent on other factors such as emissions profiles. Comparisons may be done intra-sector or intra-subsector as appropriate. As previously stated, the sector may be subdivided based on size, such that smaller companies are not competing against larger companies for ratings, or the ratings may be normalized to take into account differences in the size of firms in the same industrial sector.

The rating itself may be based on the company's operational carbon footprint, taking into account only Scope 1 and 2 emissions, or, optionally, may include Scope 3 emissions, such as upstream and downstream carbon footprints and employee or consumer travel. It may also take other, sector-specific factors into account, which may include recycling practices and other pollutants emitted which are not readily reducible to equivalent units of carbon dioxide.

To assess companies in a particular sector to determine their relative green ratings, an assessment system administered by the Greenstar company and performed either by the Greenstar company or by a third party entity will be used. Preferably, the assessment system will utilize already-existing data regarding each companies' efforts, such as, for example, the results of self-assessments and self-disclosures of carbon emissions and the reports of consultancies or other agencies. It may take into account both upstream and downstream emission factors. Other upstream, operational and downstream industry-specific factors may also be considered. Efforts at carbon offsetting may also be taken into account in calculating the net emissions and final rating. Other publicly-available information may also be used. All such data may be verifiable by audit.

Assessments may be re-evaluated on a periodic basis, preferably quarterly. Companies wishing to be re-assessed prior to their next assessment date, for example, those that may have undertaken green-related efforts, may pay a fee for an early re-assessment. Ultimately, companies may be required to pay a fee to participate in the program.

In another aspect of the invention, an indicia is used as an indication of each company's rating within their industry sector. In the preferred embodiment, a star system is utilized that awards a number of stars based on the company's rating, although the symbolism used for the indicia is not meant to the limited thereby. The star system may be utilized in the marketing of the company, such as on websites, in print and TV advertisements, on packaging, vehicles, letterheads, business cards, e-mail signatures, etc. Preferably, the stars will have a graphical appearance that reflects their green status, such as by being colored green.

In yet another aspect of the invention, the green rating received by companies will be integrated with popular internet search engines, such as Google® and Yahoo!®, such that when a company's link comes up as the result of a user-initiated search, the number of stars in the rating awarded to that company will appear in close proximity to the search result. In addition, there may be ways to search for companies that are specifically tied to the use of the Greenstar rating as a search criteria. For instance, companies may receive top billing in a list of search results based on their Greenstar rating, or users may choose a search that is filtered by Greenstar ratings by requesting that only companies having a Greenstar rating or having achieved a certain Greenstar rating appear in the search results. This is likely to have the effect of increasing the desire of non-member companies to be included in the ratings process, as, over time, increasing numbers of end users opt for the green-ratings-filtered search. In addition, the star indicia should appear when a company's link appears in a sponsored list of search results.

In another aspect of the invention, there is a website dedicated to the Greenstar rating system which will serve several functions. First, when a rated company's link is displayed with the Greenstar ratings as part of the results of a user-initiated search on a search engine page, the user may click on the stars and be taken to a page on the Greenstar website which is dedicated to that particular company. The page may contain, for example, the company's logo, news stories about the company, descriptions of green-related efforts undertaken by the company, and a click-through link to the company's home page. The page on the Greenstar website may be somewhat configurable and maintainable by the rated company.

In another aspect of the invention, there may be a facility on the Greenstar website to allow rated member companies to network or communicate with other member companies, for instance those who form a part of its upstream or downstream supply chains. This networking may take a form similar to existing online social or business networking sites, and may include the ability to display the logos or other symbols relating to the other members in a network or, other information relating to the networked members. There may be various options for security and data protection within the site. In addition, a member company may opt to display its networked members on its landing page or on other pages viewable by consumers visiting the Greenstar website.

In another aspect of the invention, rated member companies who wish to network with other companies within the Greenstar site may define networks and invite other companies to join using an automatic process administered by Greenstar. This may involve the sending of emails, printed invitations or other communications on behalf of the member. Members may be required to supply the contact information or allow access to their online or other contact databases to use this service. Members may avail themselves of this automatic invitation service either when signing up to Greenstar or at a later date.

The Greenstar website may also have pages dedicated to the Greenstar company, and may contain general information about the company, about green efforts in general, recent green-related news stories, descriptions of the rating system, and may act as a search engine that will return only Greenstar rated companies in the results. For example, the user may want to perform a keyword search or see a list of all rated companies in a particular industrial sector. The website will also maintain a database of all rated companies and may provide this information to the search engine websites such that the search engines may determine the proper number of stars to display next to each company's link in its search results, as well as the link to the company's page on the Greenstar website.

The online stars, or other ratings indicia used, may each have a unique identifying number assigned, with which to monitor and control their presence or appearance remotely. They may be composed of a simple graphic file (for example, GIF) or a programming language (for example JAVA script). They may be programmable to move or draw attention to themselves by such features as 'twinkling', for instance disappearing and appearing rapidly. Programming techniques using 'Flash' may be used for this purpose. Ratings indicia may have tracking or other data attached.

The ratings indicia, in addition to being used on or integrated with search engines, may also be used with any other type of online context now known or later developed, including, but not limited to social networking sites, online maps, satellite photographs, geo-location systems, virtual worlds, and three-dimensional environments. Such now known or later developed online contexts may utilize different methods for the collection of microfees. Such fee collection methods may be customized according to the type of online context with which the Greenstar ratings are being used.

In a final aspect of the invention, the Greenstar rating system may be used to generate income in the form of fees for both the Greenstar company and the search engines. For example, companies may be charged a fee for the display of an informational page on the Greenstar website and may agree to pay a fee for each click-through from the Greenstar website to the company's home page.

Fees may also be generated for use of the Greenstar rating on a search engine website, for example, by charging rated companies a "per impression" fee each time their link is displayed with their Greenstar rating indicia, or a "click through" fee each time a user clicks on the indicia hyperlink. These fees may be shared between the search engine and the Greenstar company.

In addition, rated companies may agree to pay a fee for the display of a Greenstar link on their web page which will take the user to the informational page on the Greenstar website. The Greenstar website may also sell advertising. In general, any way known to those of skill in the art to generate fees using internet-based models may be used, as long as the rating received by a company is not dependent in any way upon the fees paid.

DETAILED DESCRIPTION OF THE INVENTION

It is contemplated that the practice of an embodiment of the invention would include a corporate entity for the collection of revenues realized from the use of the green rating and from search engine related fees. As used herein, the term "Greenstar" or "the Greenstar company" will refer to this corporate entity. Likewise, Greenstar will, as part of this invention, own and operate a website, which will be referred to herein as the "Greenstar website." The term "member company" means any company participating in the program by receiving a Greenstar rating. These terms are not meant to be in any way limiting, as to any indicia, symbolism, or color schemes used in the practice of the invention.

It is further assumed that any description of online activity or activity relating to websites and the interaction of users, third party websites and the Greenstar website would necessarily be understood to include standard hardware and software components, including computers, storage devices, networking facilities and hardware, and software source code, that would allow or enable such activity, as would be well known to those of skill in the art, even if not explicitly otherwise mentioned.

Figure 1:
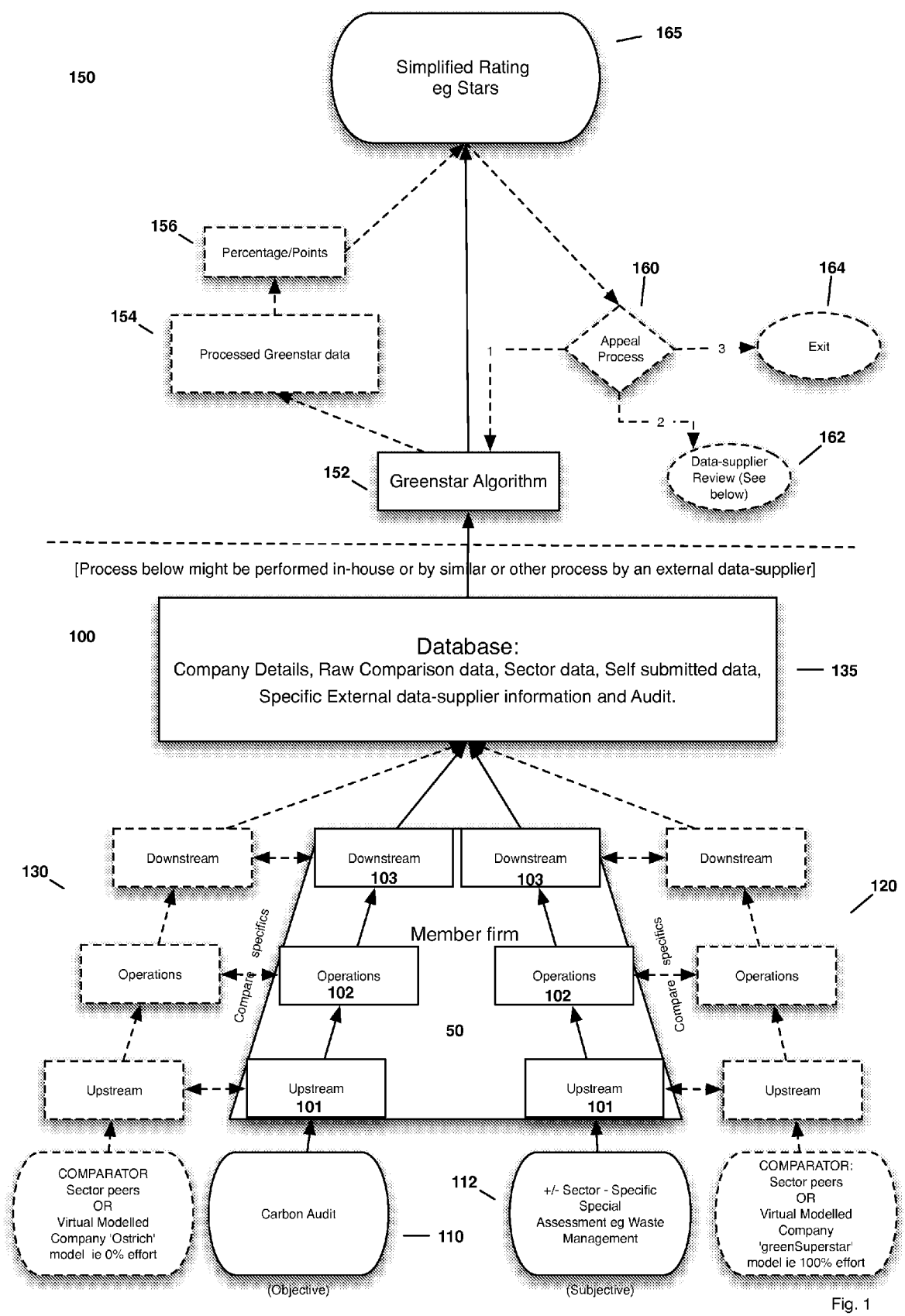
FIG. 1 is a diagram showing the method of arriving at the Greenstar rating for each company in a particular sector.

FIG. 1 shows the process by which the star rating of a member company 50 is achieved. Bottom section 100 of FIG. 1 shows the data collection process wherein data regarding upstream factors 101, operational factors 102 and downstream factors 103 are collected for each member company 50.

There are two types of data which may be collected. First, data regarding the carbon footprint 110 of member company 50 is collected for upstream activities 101, operational activities 102 and downstream activities 103. If upstream and downstream data is not yet available for member company 50, it may optionally be awarded a provisional "partial-dataset" rating based on the operational data, such that the rating would only take into account Scope 1 and Scope 2 emissions. In such cases, the member firms may only be compared to other firms in their sector with partial-datasets. They may receive a rating, which may be indicated by an indicia which is different in some respect from the indicia which is derived from full-dataset (i.e., Scope 1, Scope 2 and Scope 3 emissions data). In addition, sector specific data 112 may optionally be collected for upstream activities 101, operational activities 102 and downstream activities 103.

Both carbon footprint data 110 and sector specific data 112 may be compared with industry model comparators 120 and 130. Upper end comparator 120 is a sector peer or an idealized model company that is considered to a "green superstar" and may be, for example, the highest rated firm in the sector or may be a virtually modeled company who is considered to have made 100% effort in all phases of the supply chain. Lower end comparator 130 may likewise be a sector peer or idealized model company that is considered to be a green "ostrich" company. This may be the company having the lowest ratings in the sector or may be a virtually modeled company having made no effort to improve its green performance or environmental friendliness.

Database 135 contains information about member company 50 as well as all other member companies within the same sector as member company 50, as well as data for all member companies in other sectors. This information may include details about the company, raw data used for comparisons, aggregated sector data and specific external data information from databases and audits.

In an alternative embodiment, database 135 will contain data not only about member companies, but also about non-member companies within each sector, and member companies may be rated against all companies in the industry sector (for which data is available) as a whole and not only against other member companies. In such a case, non-member companies would not receive a rating, although their data would be used to derive ratings for member companies.

The upper portion 150 of FIG. 1 shows the process by which the simplified green rating 165 is obtained. First, data from database 135 is fed into the Greenstar algorithm 152. The algorithm may be any algorithm which takes into account, with the proper weights, all of the data collected regarding member company 50 and all other sector companies within the same sector as member company 50. The algorithm may in fact be different for different industry sectors. In its simplest form for instance, the algorithm in box 152 may comprise ranking of all member firms in a sector by net emissions expressed as a rate per unit size, and awarding ratings indicia to member firms according to their percentile ranking, for example giving a full rating for those ranked in the top 20%. In boxes 154 and 156, the results of executing algorithm 152 using data extracted from database 135 for member company 50 is generated. The raw score 154 may be turned into a percentage score 156 which represents the percentage of the maximum score in the sector which has been achieved by member company 50. The percentage score 156 is then turned into a simplified rating 165 which consists of one or more stars or other symbolized indicia being awarded to the member firm 50. The number of indicia in the preferred embodiment is zero to three but it is understood that the number of indicia used may vary between zero and any number.

In addition to the above, or in an alternative embodiment, members entities may be subject to 'spot check' or other means to ensure that they or their agents have an incentive to comply with the necessary requirements for accurate and correct data-entry. There may be a facility for imposition of penalties, such as exclusion from the system for a certain time-period, following discovery of deliberately misleading or negligently false data.

The Greenstar rating may be calculated by the Greenstar company or may be calculated by an outside, third party. Data used to derive the rating may also be considered verified or unverified. For example, data entered by a member firm about itself may be considered unverified until an audit has been performed or until the data is verified by some other means. In such cases, the member firms may receive an "unverified" rating, which may be indicated by an indicia which is different in some respect from the indicia which is derived from verified data. There may be a time-limit placed those ratings based on unverified data.

If member company 50 is not happy with the outcome of the of the simplified rating 165, there is an appeal process 160 that may be utilized, and may involve review by a different consultancy or verification agency. In box 162 the data utilized in Greenstar algorithm 152 is reviewed for accuracy regarding both the source of the data and the data itself, and the Greenstar algorithm is again executed on the data. Member companies may have the option of opting-out of participation in the program if they receive a rating which is at the lower end of their industry sector.

Figure 2:
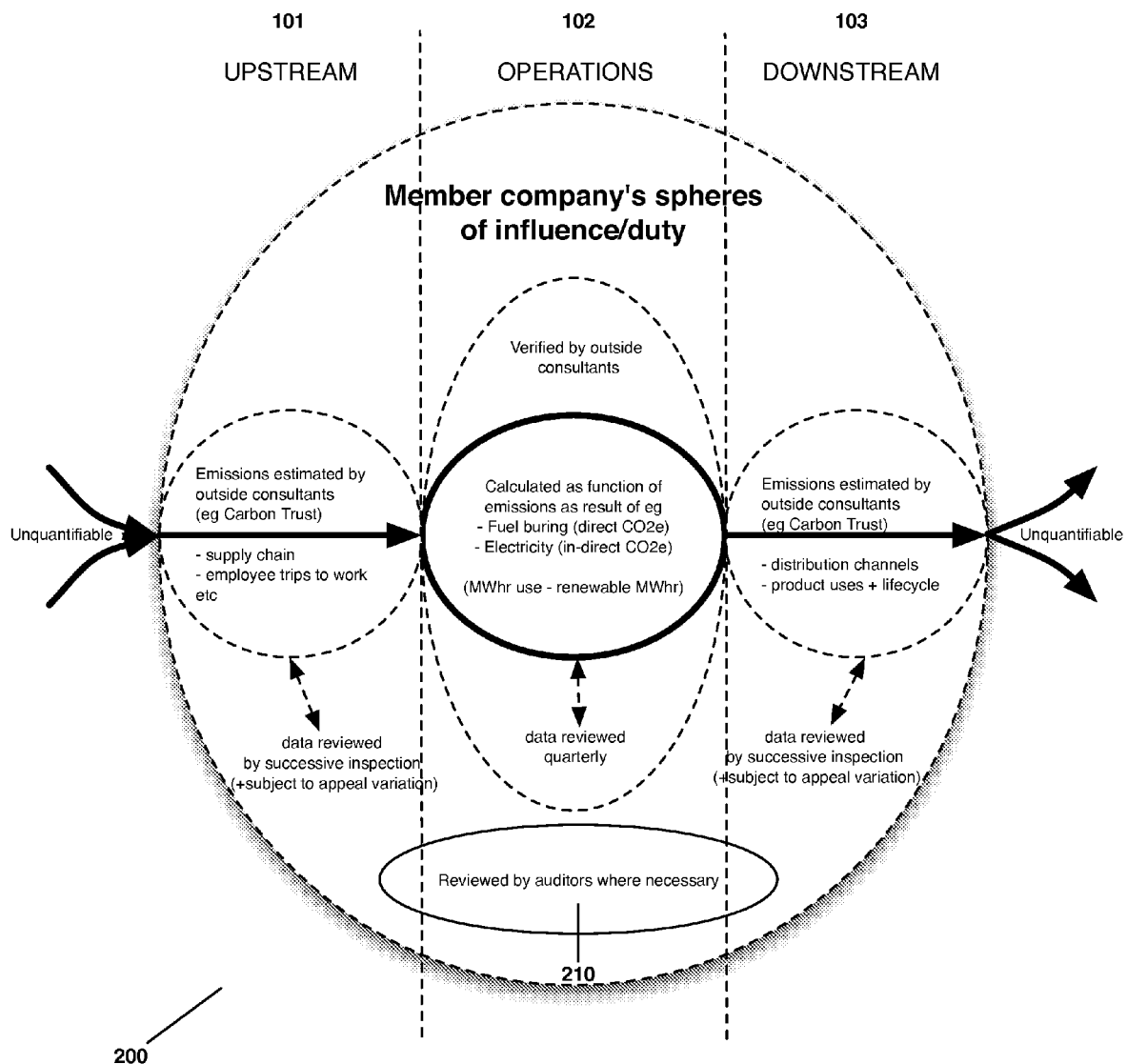
FIG. 2 shows the factors involved in the calculation of the rating.

FIG. 2 shows the carbon footprint related factors 110 which are considered for upstream activities 101, direct operational activities 102 and downstream activities 103 which make up the aggregate rating for each of the member companies 50.

Upstream data 101 may include such items as emissions of suppliers of member companies 50 and the emissions of employees as a result of their business travel and daily trips to and from work. Basically, the emissions of all entities in the supply chain including, for example, suppliers of raw materials and other goods and services may be included. Data which is further upstream 101 which may be two or more steps removed from member company 50 is considered unquantifiable and likely will not be taken into account. However, if suppliers of member company 50 are also member companies, and have received a verified rating, their ratings may be taken into account in calculating the rating of member firm 50. Likewise if twice removed suppliers are member companies, their ratings may be considered in the ratings of the direct suppliers of member firm 50 and, as a result, factors further upstream in the chain are may be considered in that manner.

The operations data 102 consists of the results of operational activity by member company 50 including, for example, direct emissions of carbon dioxide or other greenhouse gases as a result of manufacturing processes or indirect emissions of carbon dioxide/other through the use of other resources such as electrical power. The operations data 102 may be supplied directly by member firm 50, in which case it may be considered unverified, or may be verified by outside consultants or by an audit by independent auditors 210 where necessary. Preferably the data for operations phase 102 will be reviewed periodically.

Downstream data 103 consists of emissions by downstream entities within the sphere of influence of member firm 50 which may include, for example, distribution channels and the effect of the use by consumers of the products produced by member company 50 over the life cycle of the products. For example, the emissions of a trucking company utilized to distribute the products of member firm 50 may be utilized or, if the trucking company is also a member company, its rating may be taken into account. As with upstream data 101, twice removed downstream suppliers who are member companies and have been rated within their sectors may have those ratings taken into account in the calculation of the direct suppliers, and ultimately in the calculation of the rating of member company 50. Data further downstream, i.e. more then one step removed from member firm 50, may be considered unquantifiable, but may be taken into consideration, in the calculation of the ratings of downstream entities, and of their own downstream entities.

The effects of upstream activities 101 and downstream activities 103 may be taken into account in two ways, first, if the upstream or downstream supplier is a member company, their rating may be taken into account, and will necessarily include data regarding twice removed upstream and downstream suppliers of member company 50. Alternatively, raw data regarding upstream and downstream supplier may be used, in which case it may be impossible to take into account the effects of twice removed suppliers in the calculation of the rating of member company 50. The exact processes used to determine relevance and impacts of upstream and downstream suppliers may vary by industry sector but is intended to be standardized within industry sector for intra-sector comparison of member firms.

In an alternative embodiment, those downstream activities related to product use and product lifecycle assessments may be represented by a distinct and separate set of ratings indicia. Specifically, this rating would consider the environmental efficiency of the products themselves based on their ongoing use by the downstream consumer (i.e. outside of the control of the member company which made the product). This separate rating would be awarded instead of or in addition to the previously described rating (i.e. the rating resulting from the member entity's operations and upstream/downstream assessments), and would be awarded according to related but separate criteria focusing on the product in isolation. This separate ratings indicia may be similar in style, but differ by color or design, and may be displayed adjacent to the previously described ratings indicia, on all of the same media, and with otherwise identical uses and functionality. The types of products of particular suitability for this type of rating would include those products which themselves can create emissions or effect environmental damage, and may include, for example, transportation products such as aircraft, automobiles and ships, and power-consuming products such as computers, home-entertainment systems and 'white goods' such as washing machines.

The inclusion of upstream and downstream data in the calculation of the rating of member company 50 provides an incentive for member company 50 to pick the most efficient suppliers of goods and services, both upstream and downstream. The inclusion of the optional product-related rating described above may provide an additional incentive for member company 50 to develop and produce the most energy-efficient products possible.

Figure 3:
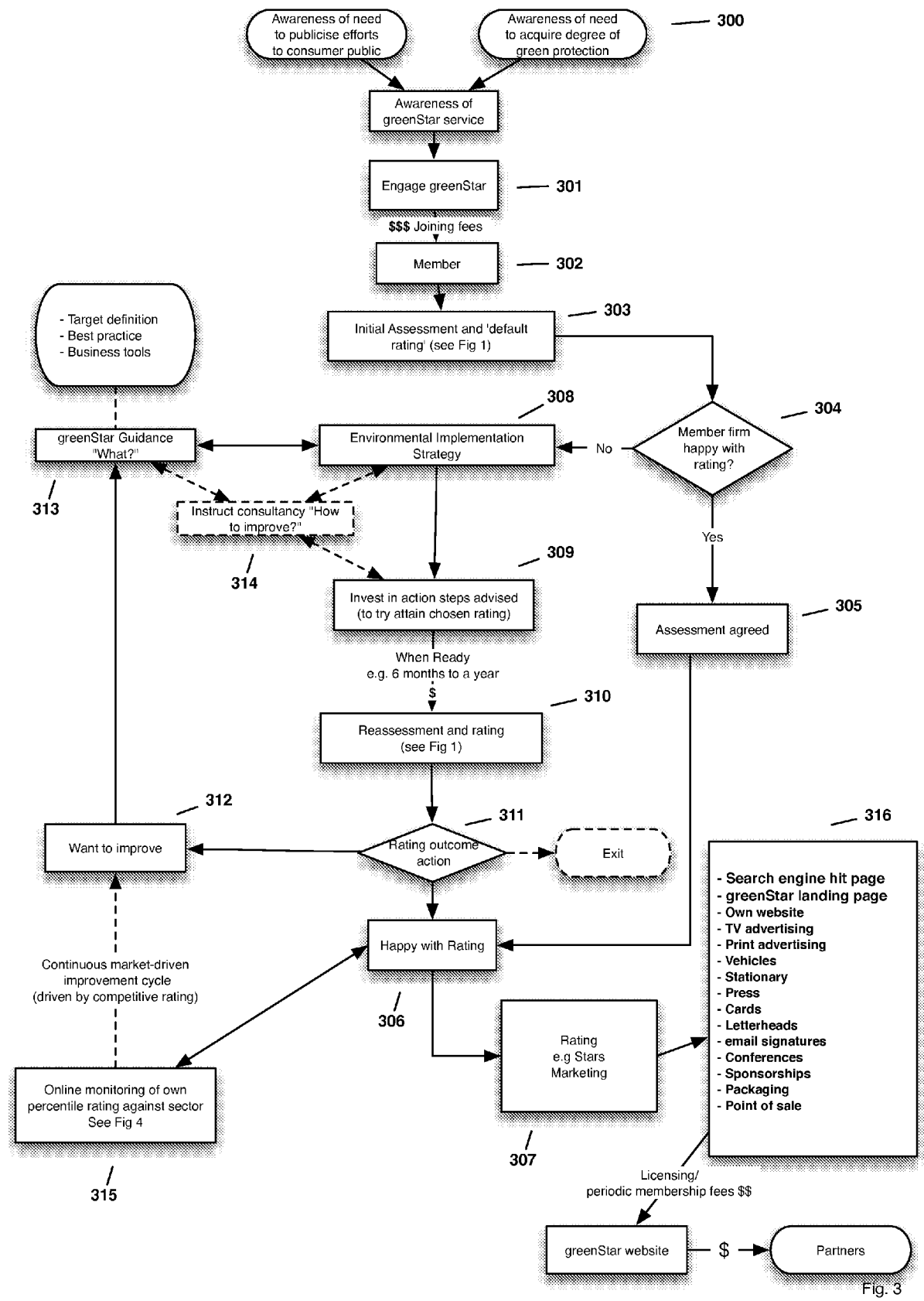
FIG. 3 shows the utilization of the system from the rated companies point of view.

FIG. 3 shows the interaction between a member company and the Greenstar company. In boxes 300, an outside company first becomes aware of the need to publicize its efforts in the green arena to the consumer public and also becomes aware of the need to acquire a degree of 'green protection' such that sufficient environmental responsibility may be demonstrated to protect against unfavorable press, and public criticism. One or both of these items may lead to an awareness of the Greenstar rating service. In box 301 the outside company may engage Greenstar and become a member company 50 in box 302. Member companies 50 may be required to pay a fee to join the Greenstar rating service, or, alternatively, may be allowed to join and become a member company for no fee. This policy may vary by sector or size of the company in question.

In box 303 an initial assessment of the new member company 50 is performed. The initial assessment may be based upon publicly available data or data which is entered by the member company itself and may be calculated in-house by Greenstar, or by an outside third party company. As previously discussed, data entered by member company 50 regarding itself may be considered unvalidated and may lead to a different kind of rating being awarded to the company indicating the unvalidated status of the data, until the data is able to be verified. The data entered includes upstream data 101, operational data 102 and downstream data 103, as previously discussed with respect to FIGS. 1 and 2.

The rating is awarded in box 303 and, in box 304, member company 50 decides whether it is happy with the rating. If member company 50 is happy and agrees with the assessment in box 305, it may start to use the rating in box 307 in the various ways described in box 316, including, but not limited to, use in its own advertising, both print and television, as well as use on items such as stationary, business cards, letterheads, email signatures, web page and via integrated use on the search engines as will be discussed below. Optionally, license fees may be collected by Greenstar for these types of uses.

Online monitoring of the percentile rating of member company 50 against other companies in its sector can be performed in box 315. Member company 50 may decide it wants to improve its rating in box 312, driven either by an initial unhappiness with its rating or by an unhappiness with its rating brought upon by continuous monitoring and improvement of other firms in the sector. In box 313, member company 50 may receive guidance from Greenstar, or a third-party consultant brokered or controlled by Greenstar, as to ways that the rating may be improved, for example, suggesting that member company 50 switch to another, higher rated supplier of raw materials or power. In box 314 Greenstar may provide consulting services for a fee or at no charge to member company 50, providing guidance as to what factors may be modified to effect the maximum improvement in rating of member company 50. In box 308, member company 50 may employ an environmental implementation strategy to implement the advice of the Greenstar consulting and in 309 may invest in various action steps to obtain a higher rating. In box 310, after a period of time wherein the action steps taken by member company 50 to improve its rating have taken effect, a reassessment may be performed and a new rating issued. In box 311, member company 50 may examine its rating and decide again in box 306 if it is happy with its current rating.

Figure 4:
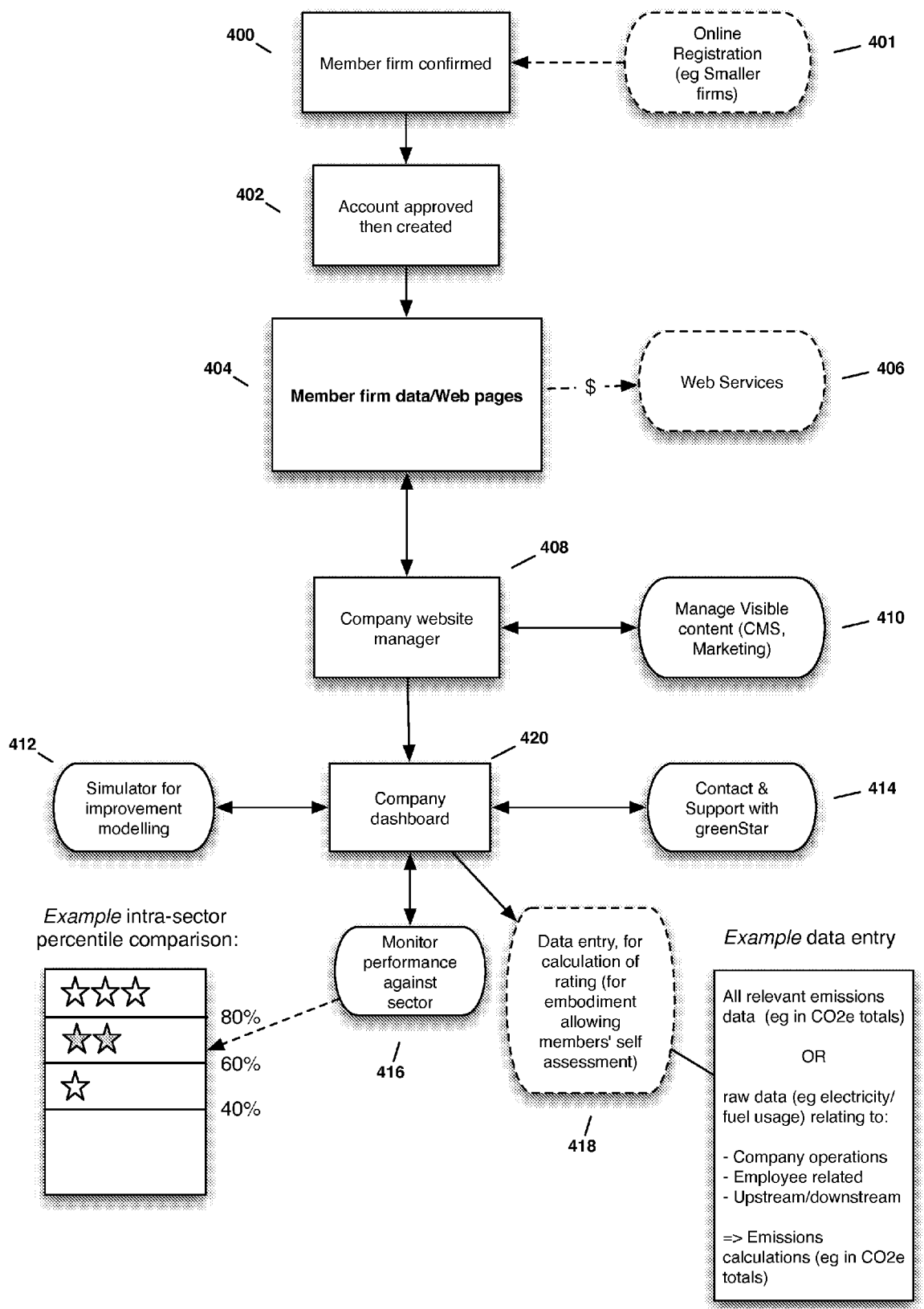
FIG. 4 is a flow chart showing the flow of control on the website of the rating company.

FIG. 4 shows the manner in which member companies interact with the Greenstar website and receive services therefrom. In box 400, the outside company is confirmed as being a legitimate company and in box 402 the new account will be approved and created on the Greenstar website. Member company 50, in box 400 may be required to submit an application which may contain extensive data regarding its green efforts and current carbon footprint. This may be submitted online or via another electronic form or via paper. This data may also be obtained from verifiable third party sources by Greenstar. Smaller member companies, in box 401 may also fill out a simplified online registration form to become a member of the Greenstar rating system. In box 404 the company's data is stored in a Greenstar website database and a web landing page is created for the firm. Web services may be provided on the Greenstar website which are specific to each individual member company in box 406.

A central dashboard or control page in box 420, provides a place where member companies may choose from various services. In box 408, the member companies website manager may administer the online landing page of member company 50 and, in box 410, will be able to manage the visible content which appears on the landing page including, for example, logos, links to or actual copies of news stories which may highlight the company's green efforts and other marketing materials which may describe in detail the efforts undertaken by the company to implement its green program.

From dashboard 420, member company 50, in box 412, may run a simulator which will allow it to vary various factors to show their potential effect on the Greenstar rating of member company 50. For example, member company 50 may indicate that it wishes to see the effect on its Greenstar rating of switching to an energy tariff that has a higher proportion of renewable electricity generation than its current energy tariff. Various scenarios may be run by the simulator to allow the member companies to find ways to maximize their Greenstar rating.

In box 414, the member companies may contact Greenstar for support with any issue encountered in utilization of the website or with the rating system itself.

In box 416, the Greenstar website provides a means for member companies to monitor their current performance against their sector peers. This facility may allow the member companies to see their actual percentage rating in their sector and will show the various categories of Greenstar ratings for various ranges of performance percentage within the sector. For example, with respect to FIG. 4, member companies having a percentage score below 40% may not receive any stars while member companies having a rating of 80% or above may receive three stars with respect to other companies within their sector.

In box 418, in certain embodiments of the invention, member companies may be allowed to enter data and perform a self reporting process for use in the calculation of their Greenstar rating. Such data, which is entered by member companies on their own behalf, may be subject to spot checks for accuracy or the rating may be flagged as being based upon unverified data. There may be a facility for an outside firm which provides verification of the data entered by the member companies on their own behalf which will allow the rating to be reflected as a verified rating. Such an outside firm may be an accredited service partner of Greenstar and have its own dashboard on the Greenstar website allowing it to verify a given member company's rating without having to contact Greenstar directly. In this embodiment of the invention (i.e those embodiments allowing member firms to enter their own data to generate Greenstar ratings) there may also be a facility for employees of the member company to log-on and enter data regarding their individual activities related to their employment that the member company may not have recorded in a central record. Such activities may include, for example, distance traveled to work, the type of vehicle driven, work-related mileage and travel undertaken in the course of fulfilling work duties, such as flight mileage per year. The individual log on account details may contain and be tied to the employee's company email address.

Figure 5:
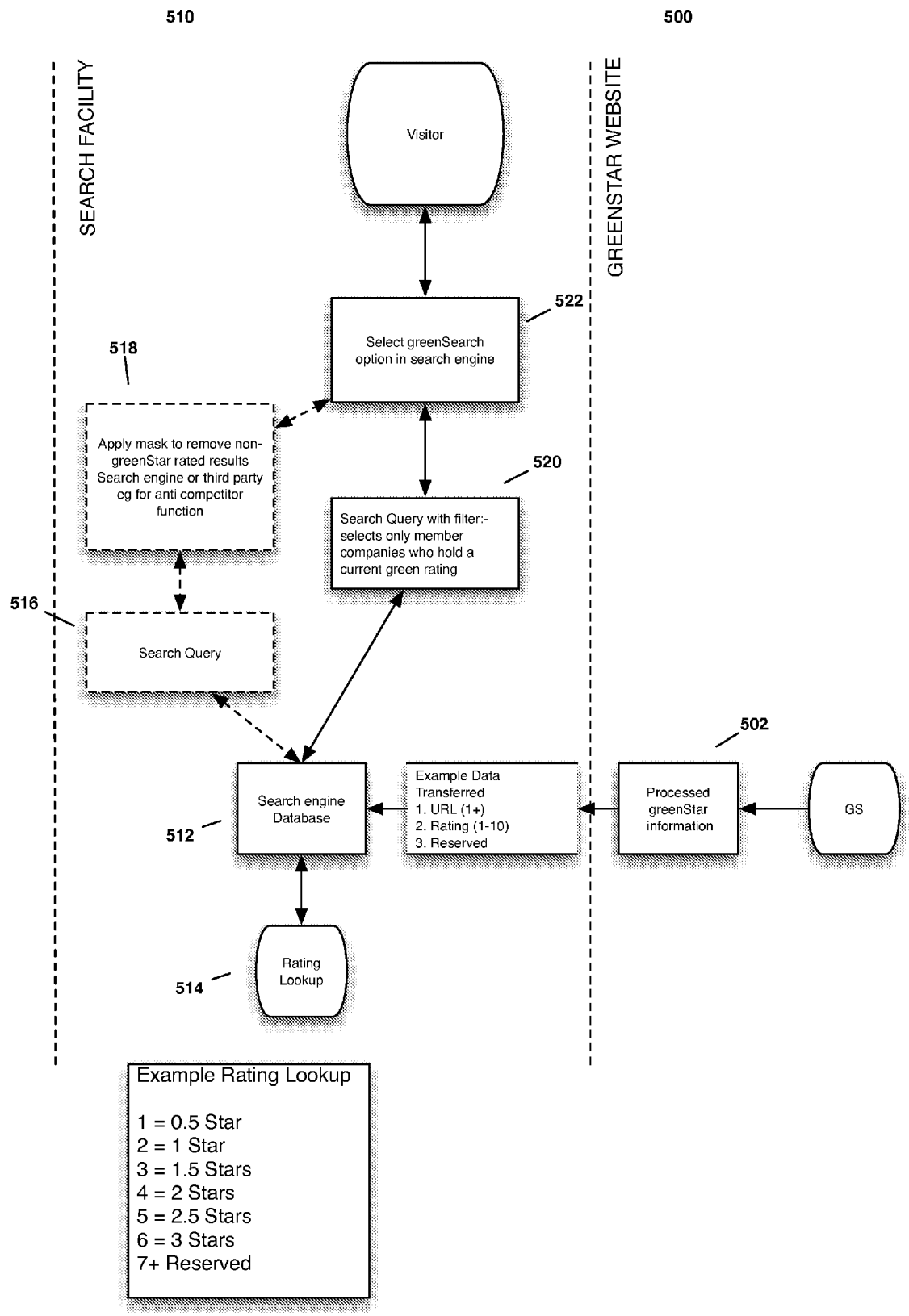
FIG. 5 shows the relationship between the Greenstar information and the search engine, the flow of data from the Greenstar website to the search engine website, and the process on the search engine wherein the Greenstar rating system is integrated into the normal search engine operations.

FIG. 5 shows the relationship between the Greenstar website and the search engines 510 which are partnered with the Greenstar company. The Greenstar website 500 contains a database 502 of processed Greenstar rating information on various member companies. The processed information will include such information as the ratings of each member company within that company's industrial sector, links to the companies' informational page on the Greenstar website 500, links to each company's own website, and other such information as is required by search engine 510 for integration of the Greenstar information onto its search result pages.

Search engine 510 will include a search engine database 512 which may reflect the data contained in database 502 on The Greenstar website and which may be used to show Greenstar ratings related to companies as the companies pop up on search result pages. Ratings lookup 514 will translate the company's rating from a numerical rating to a simplified ratings indicia such as a star rating.

With respect to the operation of the search engine and the differences between the normal searching operation and the search operation with the Greenstar rating system integrated therein, in 522, the user may select an option to utilize the search engines' capabilities but to only select results having the Greenstar rating. In this case, in box 518 a mask is applied to the normal search and submitted as the search query in 516 to the search engine database. The mask would remove any non-Greenstar rated results from the search engine. In box 520, should the user not choose to perform the search filtered by the Greenstar system the normal search typed in by the user is utilized to search the search engine database 512.

Figure 6:
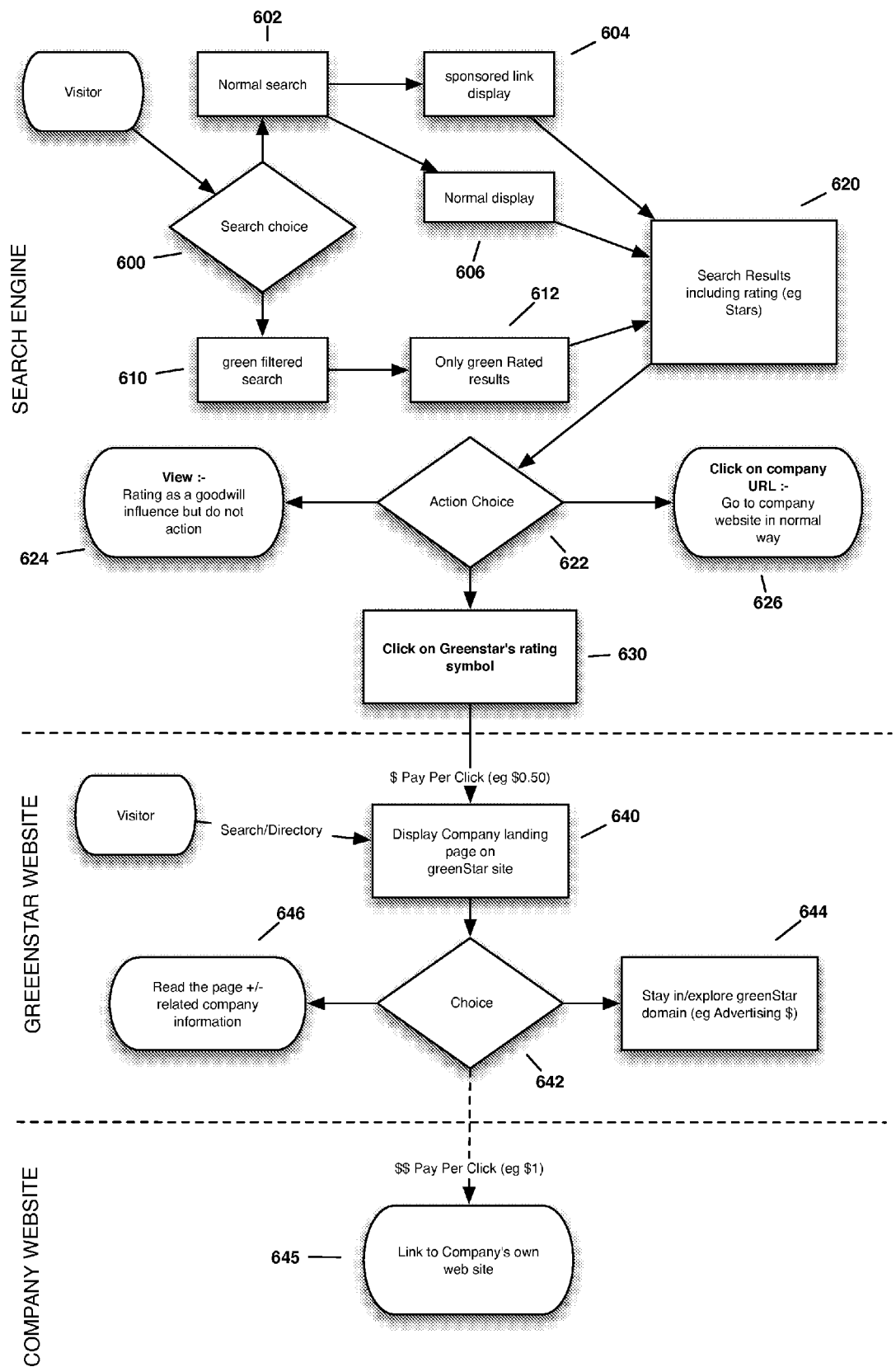
FIG. 6 shows how the Greenstar system and search engine integrated with the Greenstar system appear from a consumers point of view.

FIG. 6 shows the interaction of a typical user of a partnered search engine 510 which utilizes the Greenstar rating system. In box 600, the user has a choice of performing a normal search engine search in box 602, as is well understood by users of search pages, or performing a green filtered search in box 610. The green filtered search in box 610 returns results consisting only of companies that have been rated by the green rating system in box 610 and displays the search results including the rating in box 620.

The rating is preferably shown in the form a series of indicia consisting of green stars indicating the company's relative green strength within its industry sector. Of course any variation on the star rating system could be used including different shapes, different colors, different symbols (such as, for example, leaves, trees, or planet symbols), different letters or words (for example, containing the word 'green'), and different means of showing the difference between ratings based upon verified and unverified data. A possible option in the display of the rating is that the ratings which are based upon unverified data may be shown in a pale or faded color while green ratings which are based on verified data may be shown in a more vibrant color. Another option in the display of the ratings indicia is to show the difference between those ratings based on incomplete datasets by smaller ratings indicia, for example, smaller star symbols, relative to those ratings which are based on full datasets.

Should the user choose to do the normal search engine search in box 602, a normal display in box 606 is generated and will contain both results which include member companies and those companies which are not members of the green rating system. Preferably, in box 620 the search results from the normal internet search will include the number of green rating stars beside those companies that are members of the Greenstar rating system and which have received ratings.

In box 604, the member companies may also appear in the sponsored links list of the search results page, with their Greenstar rating displayed.

Optionally, a "cost per impression" microfee may be charged to member companies to have their URL displayed with the green rating symbol, which may vary depending on whether the member company is listed in the normal search results, or in the sponsored links section of the search results page. Any such microfee may be divided between Greenstar and the search engine 510, in any manner.

From the list of search results including the rating indicia in box 620, the user can take several actions in box 622. Naturally, in box 624 the user can peruse the list of companies in the search results to see which include the Greenstar rating and which companies have Greenstar ratings which are higher or lower than other companies. In box 626, the user may click directly on the company's URL link which appears in the search results in the manner well understood by all users of search engines. This will result in the user being taken directly to the member company's website.

In box 630, the user may instead click on the Greenstar rating symbol which is displayed next to the company's URL and be taken to the member company's landing page on The Greenstar website at box 640. The clicking of the Greenstar symbol to reach the company's landing page on the Greenstar site may generate a "cost per click" microfee on a per click basis. This microfee may also be split between the search engine and Greenstar in any manner.

From the company's landing page on the Greenstar website in box 640, the user may have several choices of action in box 642. In box 646, the user may peruse the company's landing page and read the related information regarding the company. In box 644, the user may stay and explore the other pages within the Greenstar website which may include information on the Greenstar rating system, sector definitions, other companies within the industry sector, the landing pages of other companies within the industry sector or may include generally all other public accessible pages of the Greenstar website.

In box 642, the user may click through a link to the company's own web page in box 645, which may generate a cost per click microfee payable to Greenstar.

If user chooses to perform a normal search in box 602, the user may also select one of the sponsored link displays 604 which may be displayed separately from the regular search results on the search result page of the search engine website. The sponsored link section of this search engine's results page carries one or more sponsored links wherein a fee is paid by the company to the search engine to include the company's listing in the sponsored link display, upon clicking through the URL. Companies appearing in this section of the display with the Greenstar logo may pay both a cost per impression microfee, which is paid each time the company's name is displayed and a cost per click microfee which is paid whenever a user clicks on the Greenstar ratings stars to be taken to the company's landing page on the Greenstar website. There may also be a revenue sharing agreement for clicking through the URL in the normal way, but in the presence of the Greenstar rating displayed.

Figure 7:
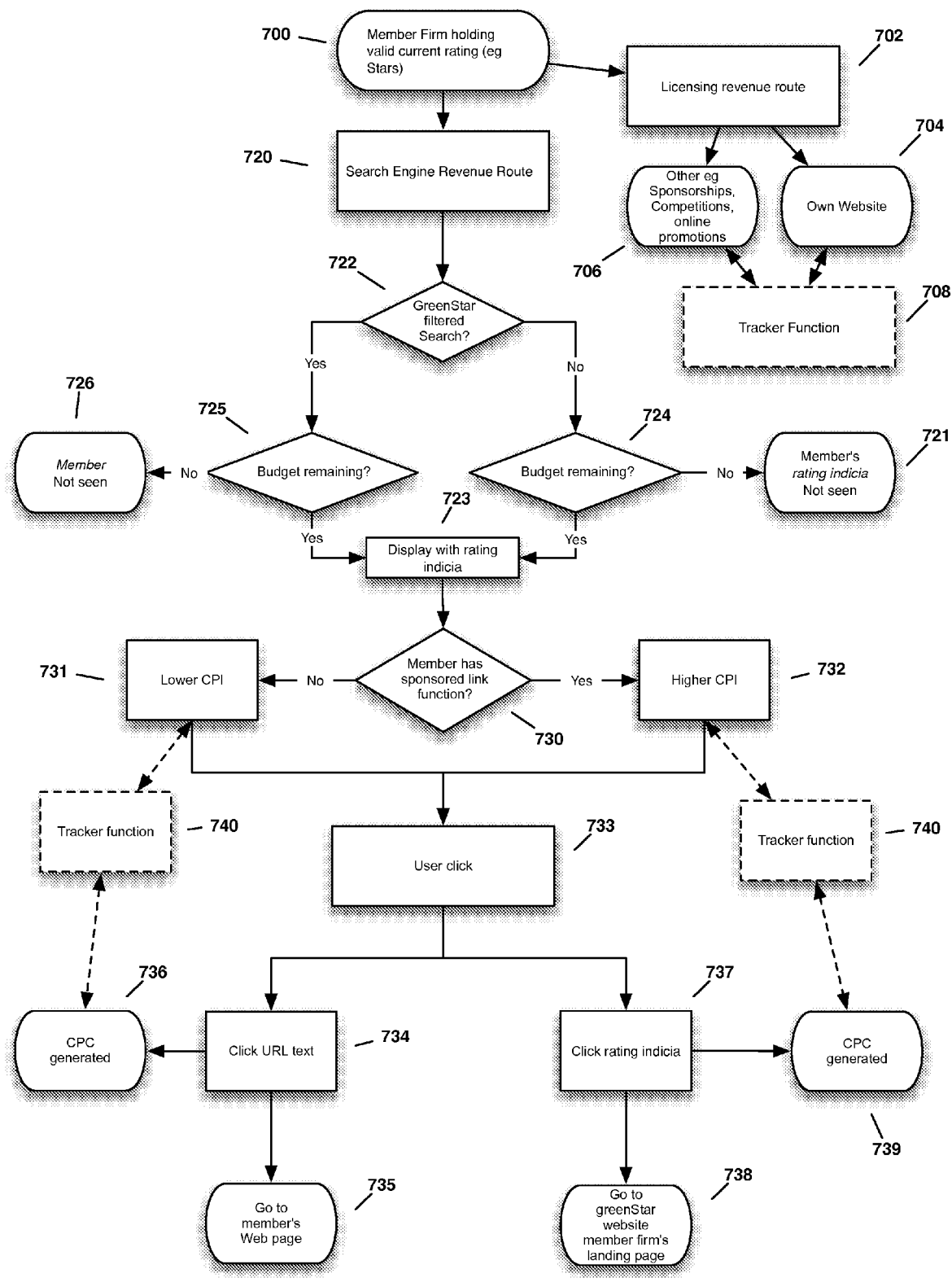
FIG. 7 shows various revenue models that may be utilized with the Greenstar system.

FIG. 7 shows various revenue models which may be usable with the Greenstar rating system. Revenues may be realized from member firms holding a current rating in box 700 by one or both of two principal means, a licensing route and a search engine route.

Licensing route 702 involves licensing payments flowing from the member company back to Greenstar for online uses of the Greenstar rating system indicia. For example, member firm 700 may utilize the Greenstar rating indicia on their own website in box 704 or on any other impressions made by the company in an online manner in box 706. Such uses may include, for example, e-mails to potential customers, sponsorships, competitions and other online type promotions. Preferably, there will be some means, as shown in box 708, of tracking the usage of the Greenstar rating indicia in the online world for purposes of insuring that the proper licensing fees are paid by the member companies to Greenstar. In addition, licensing fees may also be charged for use of the indicia in off-line contexts.

Fees may also be generated through the integration of the Greenstar rating system with search engines in box 720. In box 722, a user may perform a Greenstar filtered search or a standard search. In box 724, wherein the user is performing a standard, non-green filtered search, member companies may set up daily budgets for the payment of microfees when an impression is made on the search page website by having the Greenstar rating indicia appear with the company's URL link. If the company has funds remaining in its daily budget, the company's link is shown, in box 723 with the Greenstar rating indicia shown. Otherwise, the member company's URL link will be displayed in the results list without the Greenstar rating indicia, in box 721.

In box 725, wherein the user is performing a Greenstar filtered search (where ordinarily only Greenstar rated member companies would appear in the results), member companies may set up a daily budget for the payment of "per impression" microfees. When this daily budget is exhausted, the member company's URL Link is no longer shown in the results list, at box 726, otherwise, in box 723, the member company's URL link appears, with the Greenstar rating indicia shown. The daily budget may be shared between the GreenStar-filtered search and the standard search, or may be set separately.

In box 730 it is determined if the link being displayed is a sponsored link. Both sponsored links and non-sponsored links may optionally pay a cost per impression microfee that may be shared in some manner between the search engine and Greenstar. This fee may vary depending on whether the member company's URL link appears in the regular search results list or in the sponsored links list. For example, if the link is not a sponsored link, a lower cost per impression microfee may be charged in box 731, while a company in a sponsored link list may pay a higher cost per impression microfee in box 732.

Regardless of whether the member company's link is shown in the normal section of the search results page or in the sponsored link section of the search results page, a click through either the company's URL link or through the link formed by the Greenstar rating indicia accompanying the company's URL link in box 733 may generate a cost per click microfee that may be shared between the search engine and Greenstar. In box 734, a click on the member company's URL link will take the user to the member company's own website in box 735, and may, in addition, generate a cost per click microfee in box 736. Likewise, if the user clicks on the hyperlink formed by the Greenstar ratings indicia, in box 737, the use is take to the member company's landing page on the Greenstar website in box 738, and, in addition, a microfee may be generated in box 739.

Preferably, microfees generated either as a cost per impression fee or as a cost per click fee will be tracked in box 740 to ensure that the proper fees are allocated to both Greenstar and the search engine.

It should be understood by one of skill in the art that the system described, while explained in the context of a green rating system, could be used with a rating system based on any metrics. An example would be a "socially conscious" rating that would award companies for other intangibles, such as not utilizing child labor in foreign manufacturing facilities, or guaranteeing to reward indigenous peoples fairly and adequately for products or raw materials offered to market, etc. Once the set of metrics is defined, the invention should work identical to the one described herein for green ratings. Additionally, the invention includes the option to have a number of ratings indicia displayed together, such as the Greenstar rating, the product-specific rating previously described, and the socially conscious rating, also previously described. As a result, the invention is not meant to be limited to specific embodiments described herein, but is defined by the scope of the claims which follow.

I claim:

1. A method for utilizing a greenhouse gas emission based ratings system to generate revenue comprising the steps of:
   a. establishing metrics for calculating greenhouse gas emission based ratings within said greenhouse gas emission based ratings system;
   b. using automated computerized algorithms to use said metrics to rate a plurality of entities based on their performance as measured by said metrics;
   c. assigning an indicia representing said greenhouse gas emission based rating to each of said plurality of entities;
   d. saving greenhouse gas emission based rating data to a database
   e. correlating search queries with search engine database (and/or social networking database) and ratings database, and
   f. displaying said assigned indicia online on internet search engine pages and/or social networking sites, in close proximity (or otherwise related to) the name, logo, or URL of the rated entity; and
   g. collecting a fee from each of said entities for the use of said assigned indicia as a marketing tool.

2. The method of claim 1 further comprising the step of allowing the use and display of the ratings indicia in an online context on mobile devices.

3. The method of claim 1 wherein said step of collecting a fee further comprises the step of directly integrating with internet search engines to display the indicia assigned to one or more of said entities when one or more of said entities appears on a search results list or in a sponsored links list, said indicia appearing in close proximity to the name of or a link to said related entity.

4. The method of claim 3 further comprising the step of collecting an impression fee from said entity when said entity appears on a list with said indicia displayed in close proximity to the name of or a link to said entity.

5. The method of claim 4 wherein said impression fee is shared with said search engine.

6. The method of claim 3 wherein said displayed indicia is a hyperlink, further comprising the steps of:
   a. establishing a website having a landing page for each of said entities;
   b. displaying the landing page for a particular entity when said hyperlinked indicia corresponding to said entity is clicked by a user, and
   c. collecting a click through fee from said entity.

7. The method of claim 6 wherein said click through fee is shared with said search engine.

8. The method of claim 3 wherein said step of collecting a fee includes collecting a license fee from each of said entities for the use of said indicia in both online and offline contexts.

9. The method of claim 1 wherein said online search contexts includes search engine-related online maps, satellite photographs, geo-location systems, virtual three dimensional spaces and virtual worlds.

10. The method of claim 1 wherein said online contexts includes social networking sites with search capability and other electronic communications systems.

11. The method of claim 1 wherein said online contexts includes such contexts now known or later developed.

12. The method of claim 3 wherein only entities having an assigned rating appear on said list.

13. The method of claim 3 wherein entities having an assigned rating appear preferentially on said list or higher on said list, relative to other listed entities.

14. The method of claim 3 wherein said entities are grouped into sectors and further wherein said ratings are assigned based on the performance of said entity relative to other entities within the same sector.

15. The method of claim 14 wherein said sectors are based on industry and are sub-divided based on the size of said entities.

16. The method of claim 14 wherein said ratings are normalized for the size of said entities with each of said sectors.

17. The method of claim 16 wherein said sectors may include idealized model entities representing the highest and lowest levels of performance against said metrics.

18. The method of claim 3 wherein said ratings are absolute based on performance against said defined metrics.

19. The method of claim 1 wherein said metrics are related to environmental responsibility.

20. The method of claim 19 wherein said environmental responsibility metrics include a measure of each entity's carbon footprint and one or more sector-specific factors.

21. The method of claim 20 wherein said metrics include direct effects, upstream effects and downstream effects.

22. The method of claim 19 wherein said indicia comprises one or more symbols wherein the number of symbols in the indicia represents an entity's relative performance within its defined sector.

23. The method of claim 6 wherein said website includes, on each entity's landing page, a link to the entity's own website and informational text, pictures or videos regarding the entity.

24. The method of claim 6 wherein said website includes a search facility which allows searching among all rated entities.

25. The method of claim 1 wherein said website allows the self entry of data by an entity regarding that entity's performance as measured by said metrics.

26. The method of claim 25 further comprising a facility for employees of said entity to enter data regarding their individual activities, said data being incorporated into said entity's overall rating.

27. The method of claim 25 wherein said ratings based on self-entered data are considered unverified and may be assigned a different indicia than ratings based on verified data from third party sources.

28. A ratings method based on environmental responsibility and executed on a computer network using automated algorithms comprising the steps of:
   a. defining one or more industry sectors and grouping a plurality of entities by said defined sectors;
   b. collecting data, said data representing at least each entity's carbon footprint; and
   c. rating each entity based on said collected data relative to other entities within the defined sector of which said entity is a member; and
   d. assigning an indicia based on said rating to each of said entities.

29. The ratings method of claim 28 wherein said assigned indicia can be used for marketing purposes.

30. The method of claim 28 wherein said collected data is also a measure of one or more sectorspecific metrics that contribute to said rating assigned to said entity.

31. The method of claim 28 wherein said defined industry sectors may be further divided by the size of said entities.

32. The method of claim 28 wherein said ratings may be normalized for size within the defined sector of which said entity is a member.

33. The method of claim 28 wherein said data regarding a particular entity may be provided by said entity.

34. The method of claim 32 wherein said assigned indicia will reflect the fact that said rating is based on data provided by said rated entity.

35. The method of claim 32 wherein said assigned indicia will reflect the fact that said rating is based on an incomplete data set.

36. A system for assigning and using ratings of a plurality of entities comprising:
   a. a website, executed on an internet-enabled server;
   b. a membership facility on said website for accepting applications for member entities, said member entities to receive a rating based on a set of predefined metrics;
   c. an indicia assignment facility, for assigning an indicia to each entity based on said rating; and
   d. a plurality of landing pages, one for each of said rated entities, which display a link to the corresponding entity's own website as well as informational text, pictures or video regarding said entity;
   e. a means for placing assigned indicia on online search pages or social networking pages either directly by integration with the provider company, or by browser integration.

37. The system of claim 36 further comprising:
   a. a data collection facility for collecting data on said member entities which is a measure of said predefined metrics; and
   b. a ratings calculation facility, for rating each entity, relative to a sector containing a plurality of other entities.

38. The system of claim 36 wherein said entities are placed in one of said sectors based on industry and size.

39. The system of claim 36 further comprising a communications facility for communicating, to one or more search engine websites, information regarding each of said member entities, said information including at least the entity's rating and assigned indicia and a link to the entity's landing page on said website.

40. The system of claim 36 further comprising a simulations facility, which allows member entities to run simulations to determine the effect of varying one or more of said metrics on the entity's overall rating.

41. The system of claim 36 further comprising a monitoring facility, for allowing said member entities to monitor their performance against other entities within their predefined group.

42. The system of claim 36 wherein said data collection facility allows member entities to enter data relevant to the calculation of their rating.

43. The system of claim 36 further comprising a landing page management facility, which allows each member entity to manage the content of its landing page.

44. The system of claim 36 further comprising a facility for each rated entity to form networks comprising linkages to other rated entities.

45. The system of claim 44 further comprising an invitation system allowing a rated entity to automatically invite other rated entities to join said formed networks by supplying their contact details.

46. The system of claim 36 wherein said predefined metrics are related to the environmental responsibility of each of said member entities.

47. The system of claim 46 wherein said metrics include a measure of the carbon footprint of each of said member entities.

48. The system of claim 47 wherein said metrics include at least one metric which is sector-specific.

49. The system of claim 46 wherein said indicia assignment facility assigns one or more symbols to each of said entities, wherein the number of symbols assigned reflects each entity's sector-relative rating.

50. The system of claim 49 wherein said symbols are green stars.

51. The system of claim 46 wherein said metrics include direct, upstream and downstream factors.

52. The system of claim 36 further comprising a re-rating facility, wherein member entities can request that their rating be re-calculated or which automatically re-calculates said ratings periodically.

53. The system of claim 36 wherein said predefined metrics are related to certain performance criteria and life-cycle assessments of the products manufactured by said member entities.

54. The system of claim 36 wherein said predefined metrics are related to the social responsibility of said member entities.

55. The system of claim 54 wherein said predefined metrics include a measure of the ethical trading standards of each of said member entities.

56. The system of claim 37 wherein said sectors are subdivided by the size of said entities.

57. The system of claim 37 wherein said ratings may be normalized for size within said sector.

* * * * *